(12) United States Patent
Jones (10) Patent No.: US 6,186,596 B1
(45) Date of Patent: Feb. 13, 2001

(54) TRUCK HOIST

(76) Inventor: Eldon D. Jones, 409 E. Watonwan St., Lake Crystal, MN (US) 56055-0836

( * ) Notice: Under 35 U.S.C. 154(b), the term of this patent shall be extended for 0 days.

(21) Appl. No.: 09/266,001

(22) Filed: Mar. 11, 1999

(51) Int. Cl.$^7$ ............................................ B60P 1/16
(52) U.S. Cl. .................. 298/19 B; 298/22 R; 298/22 J; 298/22 B; 298/22 D
(58) Field of Search ................ 298/19 R, 22 R, 298/22 D, 19 B, 22 J, 22 B (56) References Cited

U.S. PATENT DOCUMENTS

| | | |
|---|---|---|
| 2,509,911 | 5/1950 | Dore . |
| 2,603,518 | 7/1952 | Golay . |
| 3,211,428 | 10/1965 | Spracklin . |
| 3,594,042 | 7/1971 | Gauch ................................ 298/22 D |
| 4,029,358 | 6/1977 | Bergdolt ............................. 298/19 B |
| 4,052,105 | 10/1977 | Moe .................................... 298/22 J |
| 4,176,881 | 12/1979 | Cole .................................... 298/22 J |
| 4,762,370 | 8/1988 | Corompt et al. ................... 298/19 R |
| 5,048,896 | * 9/1991 | Channell ............................. 298/22 J |

\* cited by examiner

*Primary Examiner*—Stephen T. Gordon
(74) *Attorney, Agent, or Firm*—Hall, Priddy, Myers & Vande Sande

(57) ABSTRACT

A hoist for raising and lowering a truck bed to and from a truck frame is provided which utilizes a lever to accomplish initial lift and to further position the hydraulic cylinder at a more efficient angle for completion of the lift process. The hoist further provides a locking device to immobilize the lever and one end of the hydraulic cylinder during certain phases of the raising and lowering cycle, improving safety and stability in the dump bed raising and lowering process.

20 Claims, 8 Drawing Sheets

TRUCK HOIST

FIELD OF THE INVENTION

This invention relates to new and improved hoists useful for raising or lowering the dump bed of a truck. More particularly, this invention relates to underbody hoists which provide substantially improved lifting efficiency of the hydraulic cylinder and optionally provide a mechanism for locking the cylinder in place to provide greater stability when the dump bed is elevated during the dumping operation.

BACKGROUND OF THE INVENTION

Many types of hydraulic hoists have been developed over the years which are particularly useful as underbody hoists for raising and lowering a dump bed, such as the dump bed of a heavy duty dump truck or trailer. Generally speaking, these hoists employ hydraulic cylinders which, when activated, pivot the dump bed about its rear pivots connected to the frame of the truck chassis.

In a typical hydraulic truck hoist, a hydraulic cylinder lies lengthwise between the framerails of the vehicle and underneath the truck bed. As the hoist's cylinder extends, one end pushes against the underside of the dump bed while the other end of the cylinder, being pivotally attached to the frame members (usually cross members) of the vehicle, pivots to allow the dump bed to raise. At the beginning of the lifting process, the cylinder is nearly parallel to the dump bed and thus has very little initial leverage. Most of the force of the cylinder at this point in the lift process is directed towards the rear hinge that connects the dump bed to the truck frame. Due to this inefficiency, large cylinders are required to provide the substantial forces necessary to achieve this initial lift.

Many types of hydraulic hoists have been developed to address this initial lift problem. In one example, telescopic cylinders are mounted farther forward on the truck frame. This provides the cylinder with greater initial leverage. However, the cylinder in such devices usually must have a rather long stroke to achieve a sufficient dump angle.

Other attempts to improve these hoists have included the use of a simple lever arm to provide the lifting motion in an attempt to obtain a more efficient lift angle. Examples include those hoists disclosed in U.S. Pat. No. 4,052,105. Other designs include those disclosed in U.S. Pat. Nos. 2,509,911; 2,603,518; and 4,762,370. These patents disclose hoist designs where a lever provides the initial lift of the truck bed, and a cylinder completes the lifting process.

Generally speaking, truck hoist designs known prior to the subject invention have one or more drawbacks associated with their use. For the most part, they often require large and expensive cylinders. Many are difficult to install or manufacture. Other designs are subject to large stresses, are potentially unstable when elevated, or do not achieve superior initial lift. Stability problems have been known to occur, for example, when wet loads are carried and the entire load is not eliminated during the dumping operation, leaving, for example, some of the load in the most elevated part of the dump bed.

In view of the above, it is apparent that there exists a need in the art for a hoist which can efficiently raise and lower a truck bed and which is not subject to the above drawbacks. It is a purpose of this invention to fulfill this need in the art, as well as other needs which will become apparent to the skilled artisan once given the following disclosure.

SUMMARY OF INVENTION

Generally speaking, this invention fulfills the above-described needs in the art by providing a hoist for raising or lowering a truck bed to and from a truck frame which is capable of being located between the bed and the frame, the hoist comprising: an extendible and retractable cylinder connected at one end to a lever mechanism and at the other end connectable to the underside of a bed, the lever mechanism comprising at least a first pivot, a first pivot centerline, a second pivot, and an elongated arm, the first pivot being attachable to a truck frame and the second pivot being rotatably attached to the cylinder, the second pivot being located at a first offset distance from the centerline of the first pivot, and being rotatable about the first pivot when the cylinder is extended or retracted, the elongated arm being pivotally connected to the first pivot at one end and comprising a first roller mechanism for engagement with a truck bed at the other end, the elongated arm extending and angling upwardly from the first pivot; the lever mechanism being so located that when the cylinder is caused to extend, the cylinder pushes against the lever mechanism causing the lever mechanism to rotate about the first pivot, and causing the elongated arm to raise the bed from the frame; the hoist further including a stop mechanism so located at a selected offset distance from the first pivot centerline opposite the side of the first pivot centerline of the first offset distance, such that when the second pivot is caused to rotate into contact with the stop mechanism, further extension of the cylinder causes the cylinder to raise the bed further from the frame.

In certain further embodiments of this invention, a hoist for raising or lowering a truck bed to and from a truck frame capable of being located between the bed and the frame comprises: an extendible and retractable cylinder connected at one end to a lever mechanism and at the other end connectable to the underside of the bed, the lever mechanism comprising at least a first pivot, a second pivot, and an elongated arm, the first pivot being attachable to the truck frame and the second pivot being rotatably attached to the cylinder, the second pivot being located at a first offset distance from the centerline of the first pivot, and being rotatable about the first pivot when the cylinder is extended or retracted, the elongated arm being pivotally connected to the first pivot at one end and designed for engagement with the truck bed at the other end, the elongated arm extending from the first pivot; the lever mechanism being so located that when the cylinder is caused to extend, the cylinder pushes against the lever mechanism causing the lever mechanism to rotate about the first pivot, and causing the elongated arm to raise the bed from the frame; the hoist further including a stop mechanism such that when the lever mechanism is caused to stop by the stop mechanism, further extension of the cylinder causes the cylinder to raise the bed further from the frame; the hoist further comprising a locking device to lock the second pivot at its point of rotation about the first pivot.

In certain other embodiments, the locking device comprises at least one locking mechanism pivotally connected to the hoist, at least one linkage mechanism pivotally attached to the lever mechanism on the first pivot and pivotally attached to the locking mechanism, a second roller mechanism pivotally attached to the linkage, whereby, when the cylinder raises the bed, the second roller mechanism rolls against the cylinder causing the linkage mechanism to position the locking mechanism against the force of a biasing mechanism, such that the second pivot locks at its position of rotation about the first pivot.

In still further embodiments, a track mechanism is provided which is connectable to the underside of the truck bed for engagement with the elongated arm. This track may extend either parallel to or at angle to the truck bed.

This invention will now be described with respect to certain embodiments thereof as set forth in the accompanying illustrations, wherein:

DETAILED DESCRIPTION OF CERTAIN EMBODIMENTS

Figure 1:
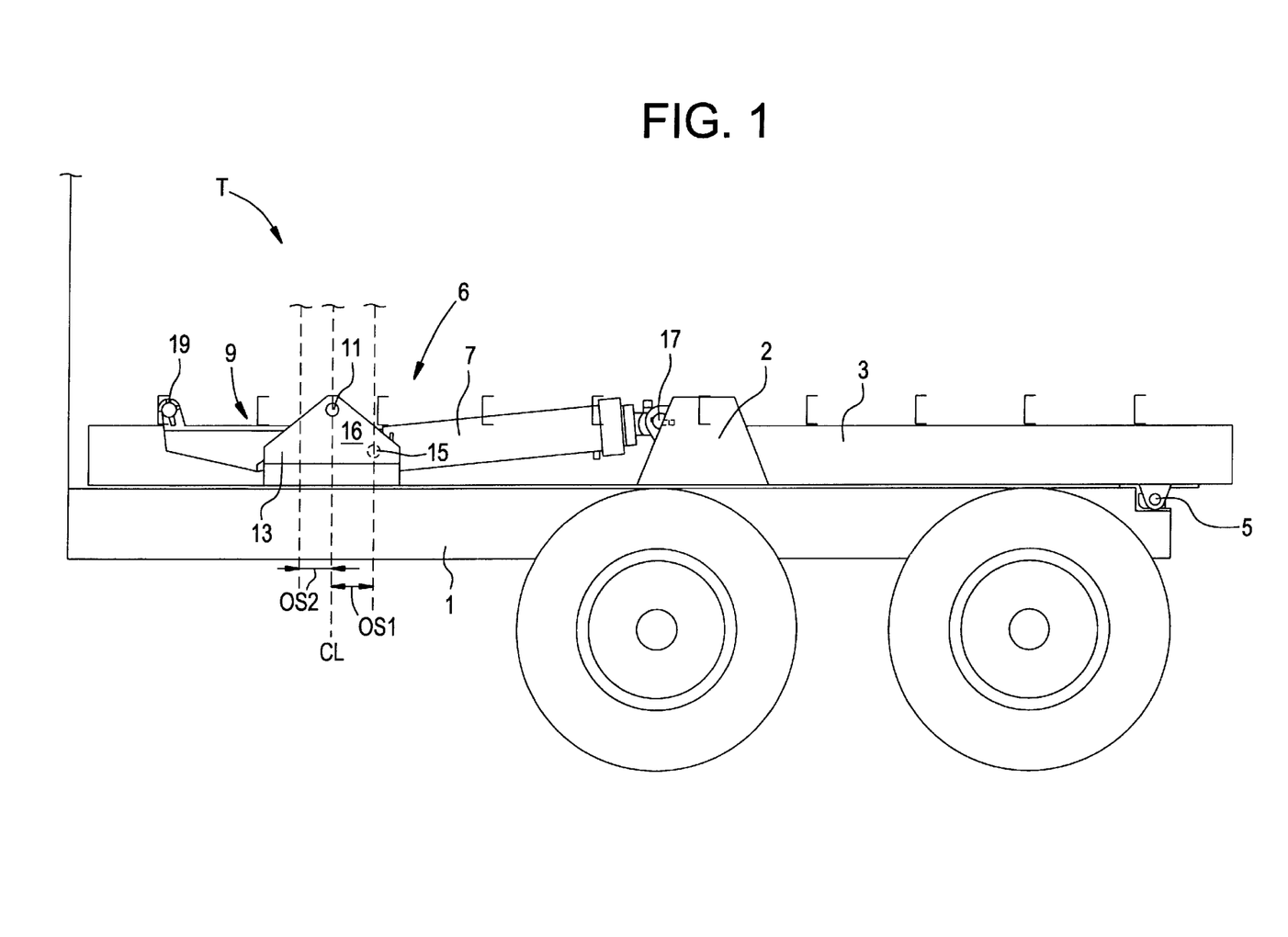
FIG. 1 is a partial side view of a truck having a raisable and lowerable dump bed, embodying a hoist according to the subject invention.
Figure 2:
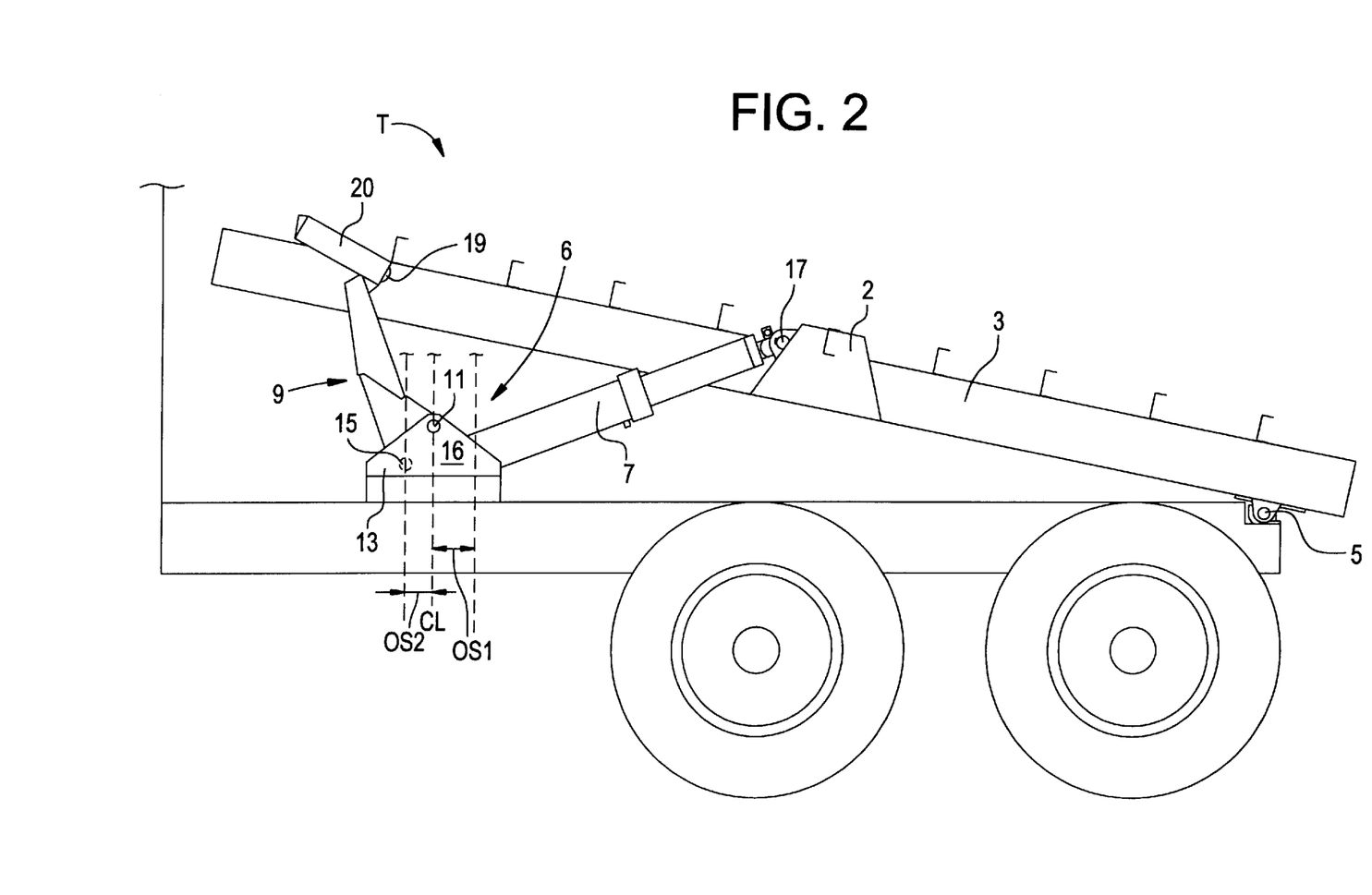
FIG. 2 is a side plan view of the embodiment of FIG. 1 illustrating the hoist near the end of the first lift phase.

With initial reference to FIG. 1, there is illustrated a partial view of a conventional dump truck T with various conventional parts not shown so as to better illustrate novel hoist 6. Generally speaking, however, dump truck T's relevant parts as they relate to this embodiment of the invention include a pair of longitudinal truck frame rails 1 on either side of the vehicle, frame 3 of a typical dump bed (the actual bed being omitted for clarity), and a rear pivot 5, all conventional in the art. Further illustrated in FIGS. 2, 3, 4, and 5 are the various elements of a hoist 6, as one exemplar embodiment according to this invention. As illustrated, hoist 6 is attached between truck frame rails 1 and frame 3 of the dump bed by mounting bracket 13. Hoist 6 is further pivotally attached at pivot 17 to dump bed frame mounting bracket 2. Dump bed frame mounting bracket 2 is fixedly connected to the underside of dump bed frame 3 and contains pivot 17. Hoist 6 is comprised of an extendible and retractable cylinder 7 and a lever mechanism generally indicated at 9. Optionally, a track 20 is attached parallel or at an angle to dump bed frame 3.

Figure 4:
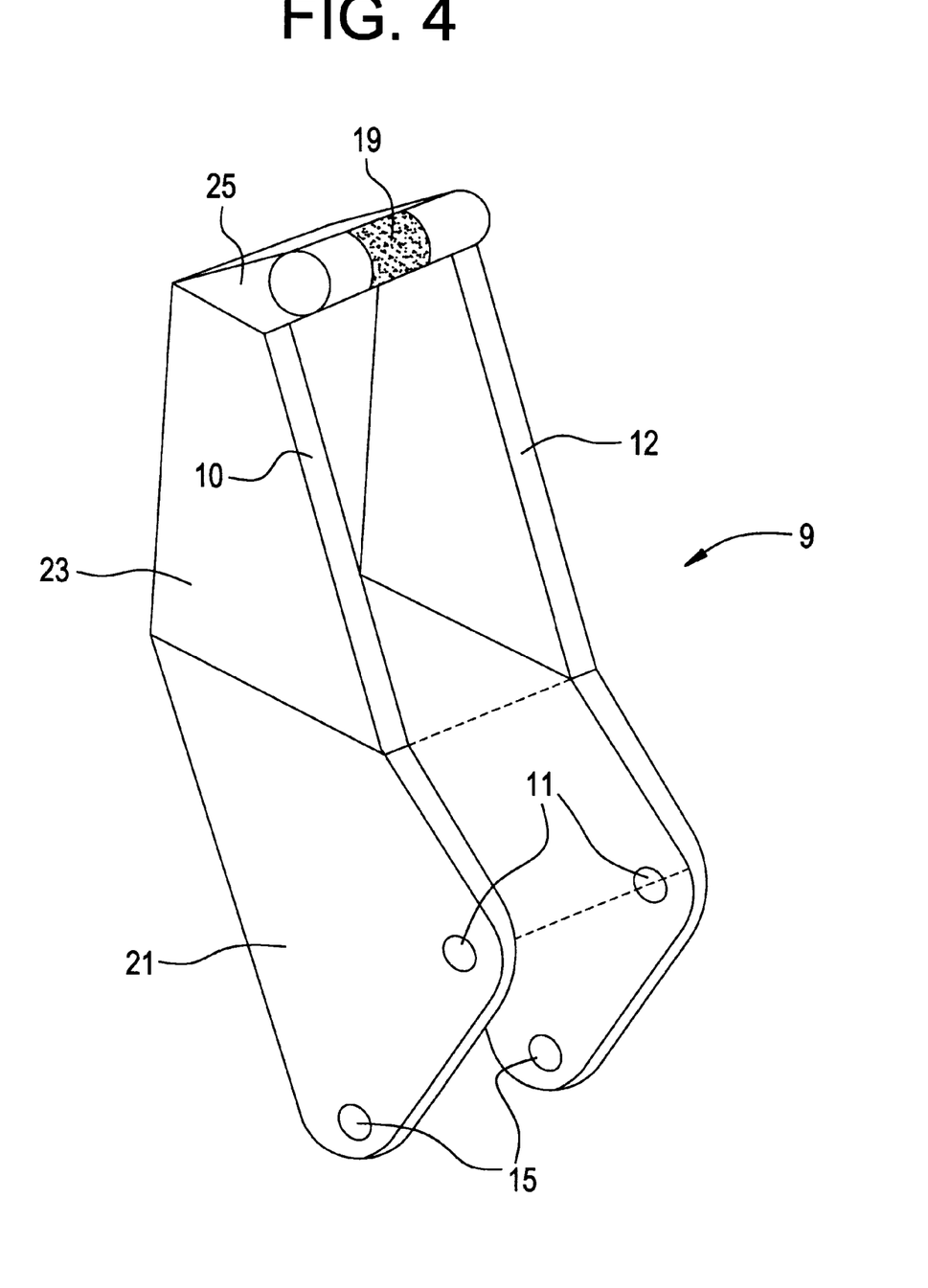
FIG. 4 is a partial, 3-dimensional view of the lever mechanism, top plate removed, according to the subject invention.
Figure 5:
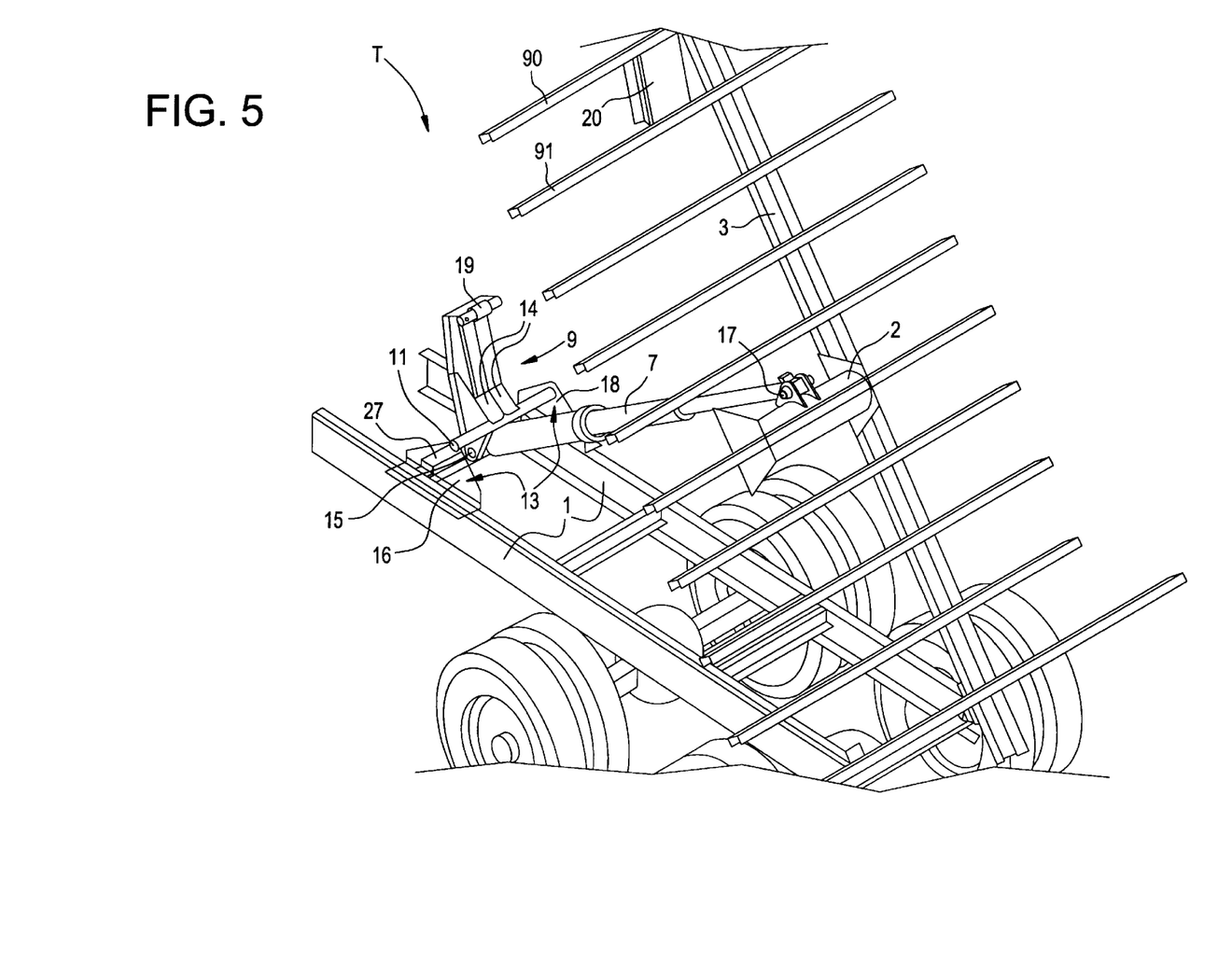
FIG. 5 is a partial 3-dimensional view of the embodiment of FIG. 1 with certain parts shown in X-ray.
Figure 7:
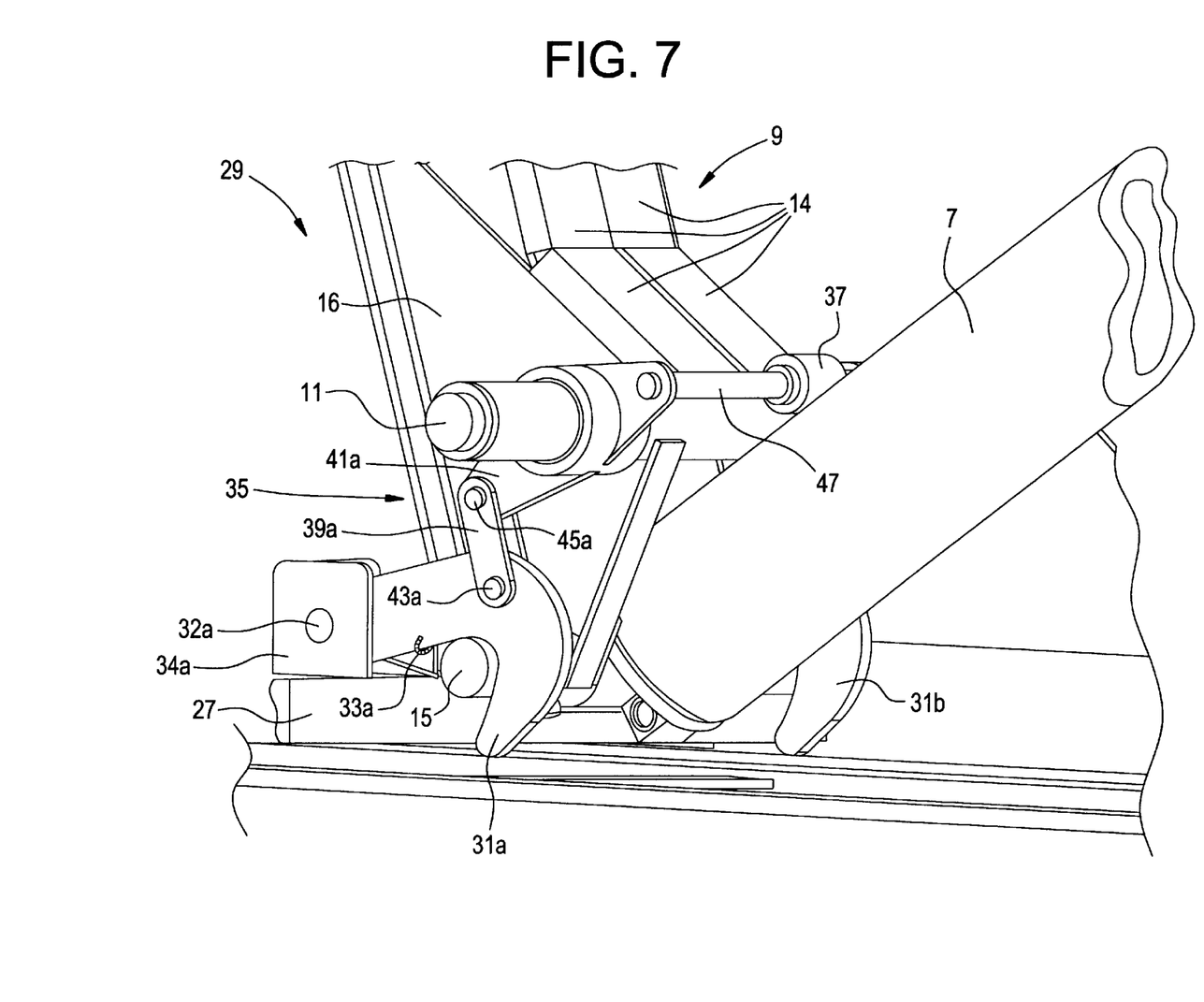
FIG. 7 is a partial rearward 3-dimensional view of the embodiment of FIG. 4 illustrating the locking device in its "locked" position.

Referring particularly to FIGS. 4, 5, and 7, lever mechanism 9 includes roller 19, pivot 11, pivot 15, and an extended arm comprised of two parallel side plates 10 and 12 and optionally, a top plate structure made up of plates 14 (not shown in FIG. 4 for clarity). Roller 19 is designed for engagement with track 20 which is located on cross members 90 and 91 intermediate frame rails 3 of the dump bed. Roller 19 can be of several types including an actual roller or one which merely slides on track 20.

Figure 3:
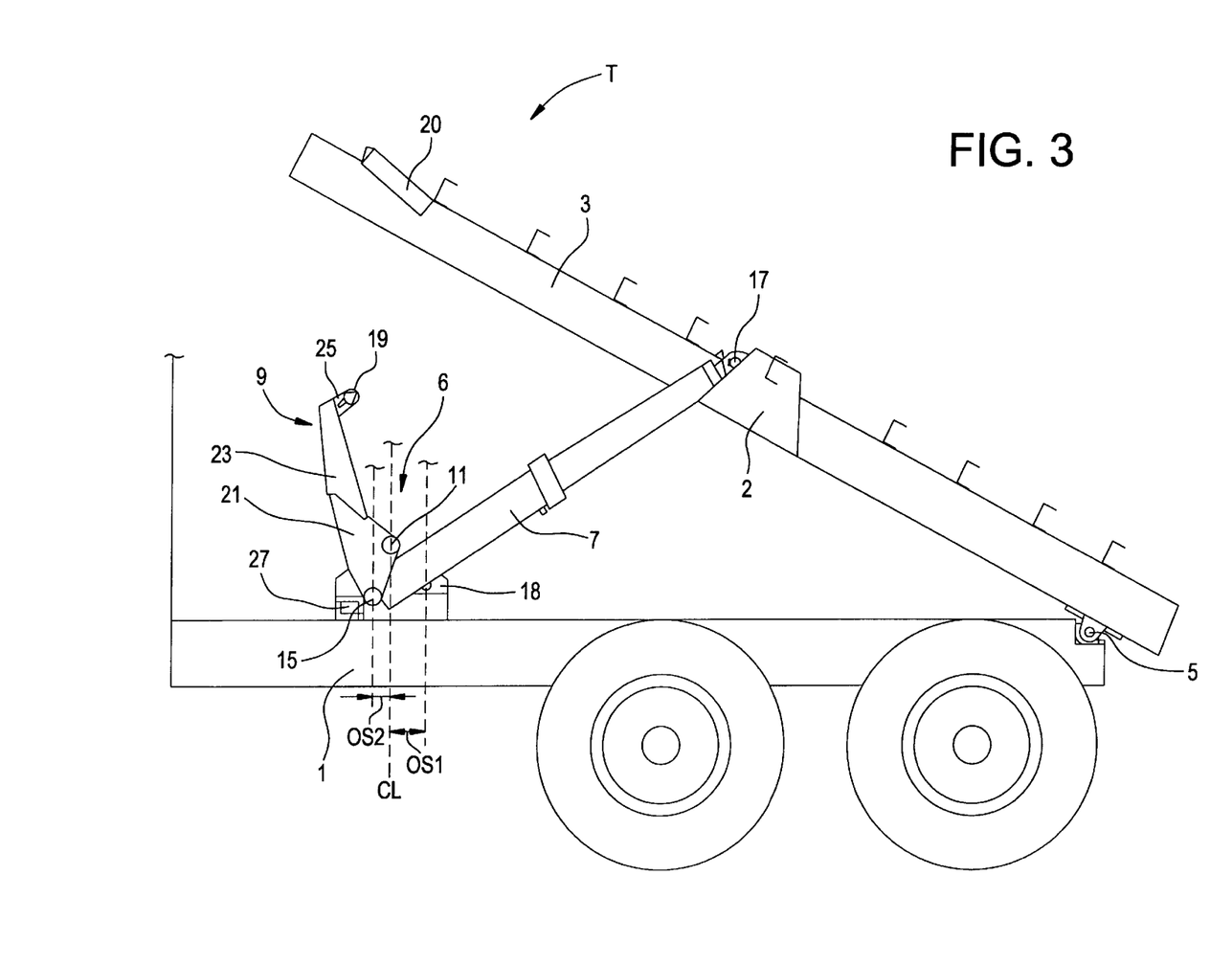
FIG. 3 is a partial side view of the embodiment of FIG. 1 showing the hoist during the second lift phase.

Pivot 11 connects lever mechanism 9 to mounting bracket 13 and has a centerline CL whose importance to this invention will be disclosed more fully below. Pivot 15 on lever mechanism 9 serves as its pivotal connection to cylinder 7. More specifically, cylinder 7 is pivotally attached at its base to pivot 15 between parallel side plates 10 and 12. At its opposite end, cylinder 7 is pivotally connected to dump bed frame mounting bracket 2 at pivot 17. When hoist 6 is in the lowered position as in FIG. 1, pivot 15 is located at a first selected offset distance OS1 from centerline CL of pivot 11, towards the rear pivot 5 of the vehicle. Top plate structure 14 comprises a plurality of flanges (plate members) extending perpendicular from side plates 10 and 12. Top plate structure 14 joins side plates 10 and 12 along the length of lever mechanism 9 from pivot 11 to roller 19, leaving lever mechanism 9 substantially open at pivot 15 for connection to cylinder 7. Referring to FIGS. 3 and 4, the embodiment of lever mechanism 9, as illustrated, further includes three segments 21, 23, and 25. These segments form an obtuse angle at the junction of segments 21 and 23 and at the junction of segments 23 and 25. Segment 23 angles upwardly and rearwardly as it extends from its junction with segment 21, and segment 25 angles further upwardly and rearwardly as it extends from its junction with segment 23.

It is understood, of course, that it is the relative location of roller 19 and pivots 11 and 15 which principally enables the efficiency of the subject invention. Lever mechanism 9, as is apparent to the skilled artisan, may be of a different construction while still incorporating the important relative locations of these pivots etc.

Referring now to FIG. 5, pivot 11 comprises a cross-shaft assembly which substantially spans the width between frame rails 1 and pivotally attaches lever mechanism 9 to mounting bracket 13. Mounting bracket 13 is fixedly attached to truck frame rails 1. Mounting bracket 13 comprises two opposing parallel side plates 16 and 18, each fixedly mounted on a truck frame rail 1. Mounting bracket 13 further includes stop mechanism 27. Stop mechanism 27 comprises two longitudinal cross-members spanning truck frame rails 1 between opposing parallel side plates 16 and 18 and is fixedly connected to each plate. Alternatively, stop mechanism 27 may comprise a single cross-member or may be connected to truck frame rails 1, or may be connected to both truck frame rails 1 and side plates 16 and 18. Stop mechanism 27 is further located at a selected second offset distance OS2 from centerline CL of pivot 11 on the side opposite that of OS1.

The hoist, of course, can include more than one cylinder or lever mechanism. Cylinders may be used that are either single stage or multi-stage telescopic, with multi-stage being preferred, because the forward mounting causes less stress and strain on the entire assembly. If single stage cylinders are used, the hoist assembly should normally be mounted towards the rear of the truck frame 1.

The unique operation of hoist 6 will now be described. As will be seen, hoist 6 lifts in two distinct lift phases, wherein during the critical first phase there is a two point lift, but while in the second phase, only one point of lift is employed, thereby achieving the unique efficient results of this invention.

As shown in FIG. 1, the hoist is in its lowered position before the lifting process begins. The extendible and retractable cylinder 7 lies substantially horizontal and lengthwise between truck frame rails 1 and underneath truck bed frame 3. Pivot 15 is located at its first selected offset distance OS1 from the centerline CL of pivot 11, on the side of centerline CL towards rear pivot 5. As cylinder 7 is pressurized with hydraulic oil by conventional pump and power take off apparatus (not shown), cylinder 7 begins to extend and push against its connection to lever mechanism 9 at pivot 15 to initiate the first lift phase. This causes lever mechanism 9 to rotate about pivot 11 in a clockwise direction. This rotation causes lever mechanism 9, at its roller 19, to engage with track 20 on the underside of truck bed frame 3.

As hydraulic pressure in cylinder 7 increases and cylinder 7 continues to extend, further rotation of lever mechanism 9 about pivot 11 causes roller 19 to push upwardly on track 20 and cylinder 7 to push upwardly at pivot 17. This causes truck bed frame 3 to lift, by pivoting, about pivot 5 to a height illustrated in FIG. 2. When the leading edge of lever mechanism 9 contacts stop mechanism 27, further rotation of lever mechanism 9 is prevented, thus completing the first lift phase.

As can be seen, at the end of this first lift phase, pivot 15 has rotated about pivot 11 from its starting position at the first selected offset distance OS1, clockwise and substantially past the centerline CL of pivot 11 to a second selected offset distance OS2. This second selected offset distance OS2 is opposite the side of the centerline CL of the first selected offset distance OS1. This extra rotation of pivot 15 about pivot 11 past the centerline CL to second selected offset distance OS2, as applied to the upward angular construction of lever mechanism 9, results in a superior initial lift height of truck bed frame 3 over the prior art and positions cylinder 7 at a substantially more efficient lift angle to bed frame 3. Additionally, as stated above, during this first lift phase, the hoist of the subject invention employs two distinct points of lift, ie. at roller 19 and at pivot 17. In certain designs, roller 19 may be designed to provide ⅔ of the initial lift force, while cylinder 7 at pivot 17 will then provide the remaining ⅓. In combination, this allows the second lift phase (described below) to now be completed with substantially less required force as compared to hoists known in the art. This design further utilizes up to a third less hydraulic oil, allowing the use of smaller and less expensive cylinders.

Referring now to FIG. 3, and to describe the second lift phase, lever mechanism 9 has, at the end of the first lift phase, contacted stop mechanism 27 which prevents further rotation of pivot 15 about pivot 11. As cylinder 7 is further pressurized, cylinder 7 continues to extend and pushes against pivot 17 of dump bed frame mounting bracket 2 located on the underside of dump bed frame 3. This additional extension of cylinder 7 further raises dump bed frame 3 about pivot 5 and causes roller 19 of lever mechanism 9 to disengage with track 20 because stop mechanism 27 prevents further rotation of lever mechanism 9. Dump bed frame 3 continues to be raised solely at pivot 17 until it is in a fully raised position. This completes the second lift phase.

Figure 6:
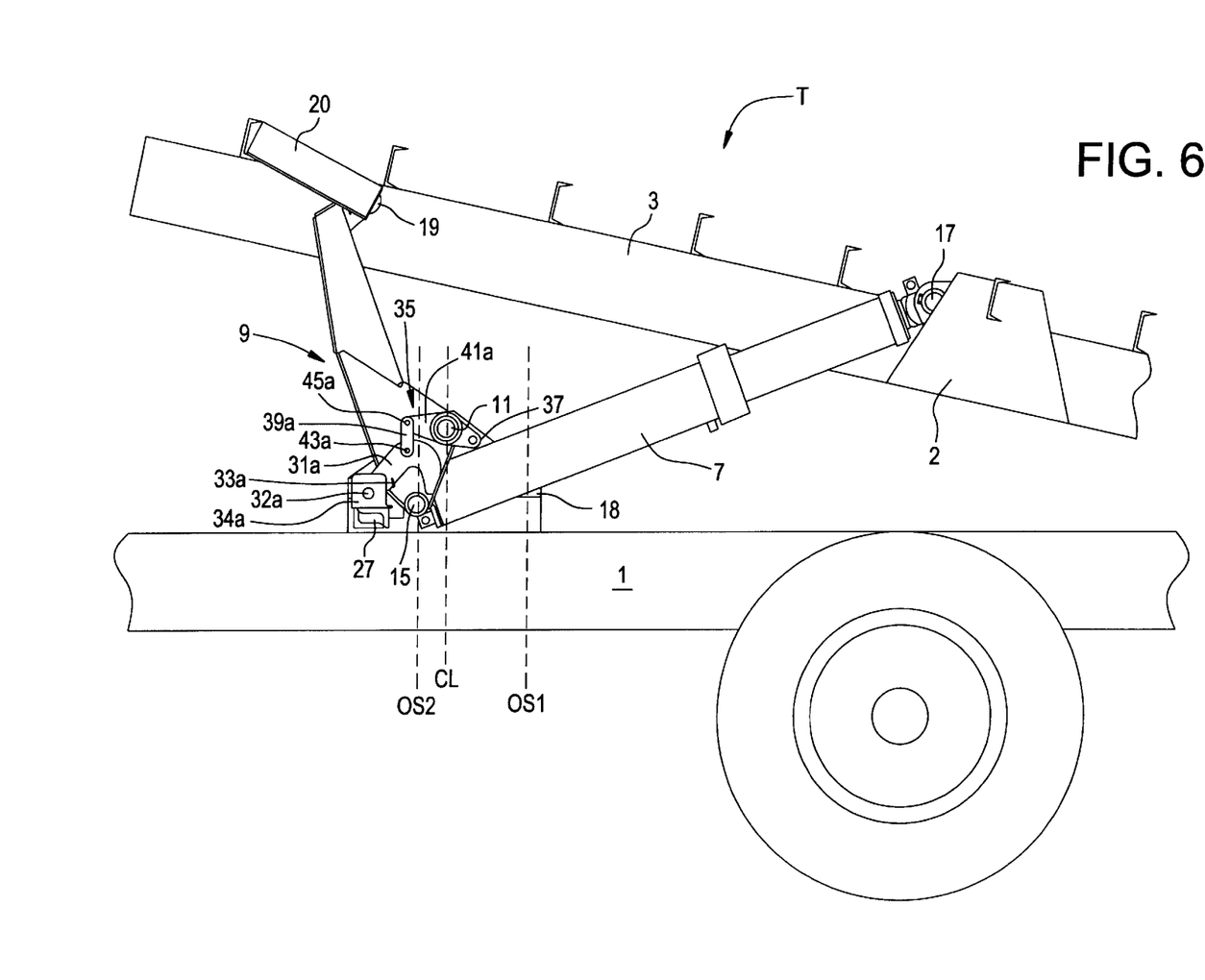
FIG. 6 is a partial side view of the embodiment of FIG. 1 further including a locking device according to the subject invention.

Referring initially to FIG. 6, there is illustrated a conventional dump truck T, which further includes a second embodiment of hoist 6 according to the subject invention, that incorporates a locking device for improved safety and stability in the dump bed raising and lowering process. Conventional dump truck T is illustrated with various conventional parts not shown so as to better illustrate novel hoist 6 and the incorporated locking device.

The locking device, generally indicated at 29, locks lever mechanism 9 and one end of extendible and retractable cylinder 7 in place during certain phases of the lifting and lowering cycle. More specifically, the locking device 29 functions by locking pivot 15 at its position of rotation about pivot 11 against stop mechanism 27. Locking pivot 15 against stop mechanism 27 immobilizes lever mechanism 9, preventing further rotation of lever mechanism 9 about pivot 11, clockwise or counter-clockwise, and further locks the base of cylinder 7 in place during these particular critical phases of the lifting and lowering cycle. This provides safety and stability to the hoist especially when lifting wet or unstable loads or when operating the hoist when the truck is on uneven or unstable ground. This feature would be particularly effective if a sudden load shift, wet load, or other such factor caused dump bed frame 3 to lift near or past vertical. The locking device 29 would help prevent severe damage to the hoist or the truck, and substantially lessen the chances of injury by preventing unwanted rotation of lever 9 about pivot 11.

Figure 8:
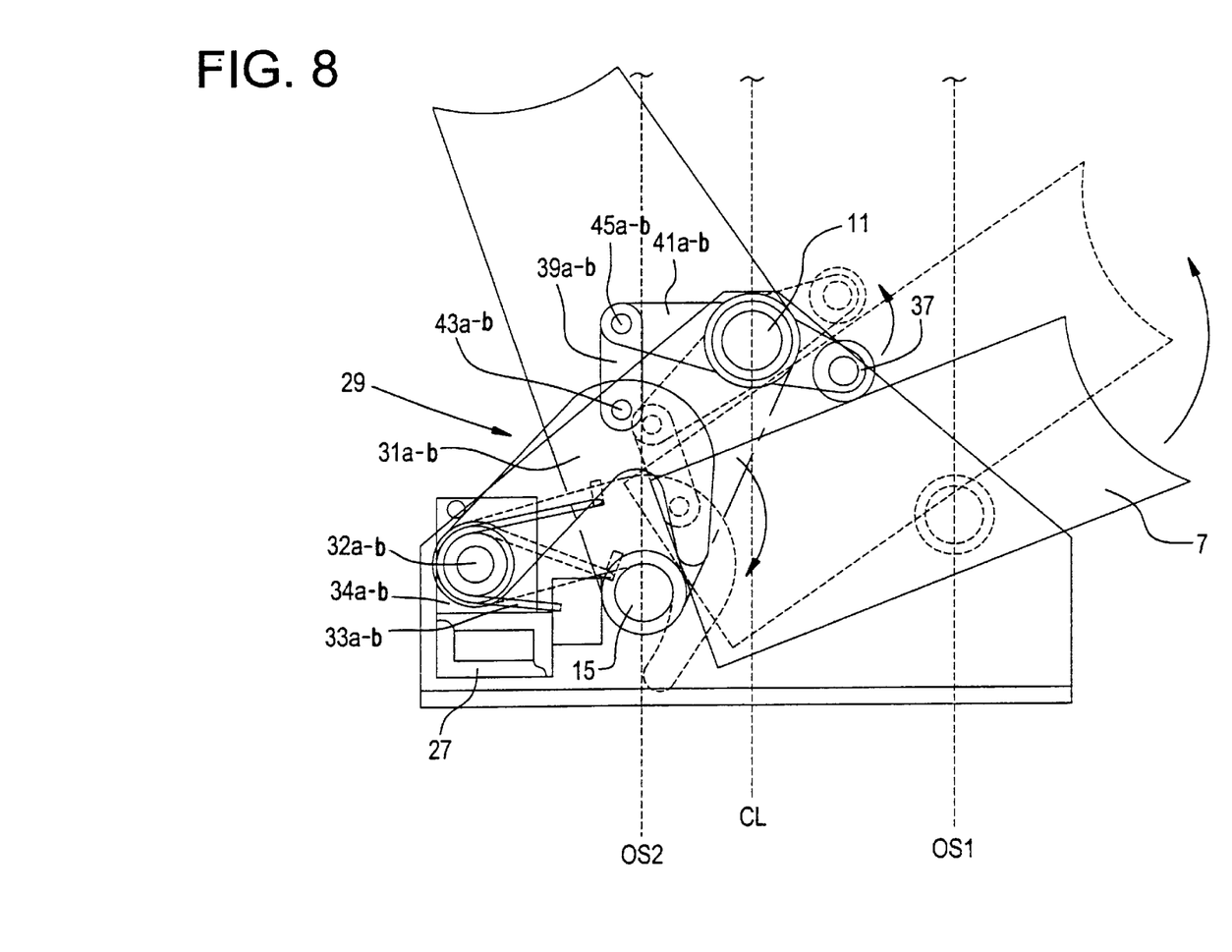
FIG. 8 is a diagrammatic representation of a partial side sectional view of the embodiment of FIG. 3 illustrating the operation of the locking device.

Referring now to FIGS. 6, 7, and 8 locking device 29 comprises two hooks 31a and 31b, two torsion springs 33a and 33b, a pivot rod 47, and a linkage mechanism, generally indicated at 35. Hooks 31a and 31b are pivotally attached to hook mounting brackets 34a and 34b at pivots 32a and 32b located above stop mechanism 27. Hook mounting brackets 34a and 34b are fixedly attached to the top of stop mechanism 27, each on one side of lever mechanism 9. Torsion springs 33a and 33b are located about pivots 32a and 32b respectively, so that they bias hooks 31a and 31b upwards and in a counterclockwise direction about pivots 32a and 32b. Linkage mechanism 35 is pivotally attached to hoist 6 at pivot 11, and is pivotally attached to hooks 31a and 31b at pivots 43a and 43b. Pivot rod 47 substantially spans the width of lever mechanism 9 and connects links 41a to 41b. Pivot rod 47 further includes roller 37 located at its midpoint.

Linkage mechanism 35 comprises two sets of links, 39a and 39b and links 41a and 41b, each pair located parallel and opposite the other set, one pair on each side of lever mechanism 9. Links 39a and 39b are pivotally attached to hooks 31a and 31b respectively at pivots 43a and 43b respectively. Links 39a and 39b are additionally pivotally attached to links 41a and 41b respectively at pivots 45a and 45b respectively. Near their midpoint, links 41a and 41b are pivotally attached to pivot 11. Pivot 11 comprises a crossshaft assembly which substantially spans the width between frame rails 1 and attaches lever mechanism 9 to mounting bracket 13. Mounting bracket 13 is fixedly attached to truck frame rails 1.

The locking device operates as follows:

During operation of the hoist, at the end of the first lift phase, lever mechanism 9 contacts stop mechanism 27, preventing further rotation of pivot 15 about pivot 11. Although rotation of lever mechanism 9 about pivot 11 has stopped, cylinder 7 continues to extend, pushing against pivot 17. This extension further raises dump bed frame 3 about pivot 5. During this second lift phase, as dump bed frame 3 raises, cylinder 7 is caused to angle upward about pivot 15 and engage with roller 37 of pivot 47. This engagement causes cylinder 7 to bias roller 37 in an upward direction, causing pivot rod 47, which contains roller 37, to rotate links 41a and 41b counterclockwise about pivot 11. This rotation pushes links 39a and 39b at pivots 45a and 45b in a downward direction. The downward movement of links 39a and 39b pushes hooks 31a and 31b, at pivots 43a and 43b, against the biasing force of torsion springs 33a and 33b. As hooks 31a and 31b are pushed against the biasing force of torsion springs 33a and 33b, the hooks rotate about pivots 32a and 32b in a clockwise direction and are positioned over pivot 15. The resulting placement of hooks 31a and 31b, so that they encompass pivot 15, locks pivot 15 at its point of rotation about pivot 11 and against stop mechanism 27.

Locking pivot 15 against stop mechanism 27 immobilizes lever mechanism 9, preventing unwanted rotation of lever mechanism 9 about pivot 11, and further locks the base of cylinder 7 in place during these particular critical phases of the lifting and lowering cycle.

Reference is now made to FIG. 8 in which the operation of the locking device 29 and the upward angular movement of cylinder 7 about pivot 15 is demonstrated. It is understood, of course, that locking device 29, illustrated in FIG. 8, is comprised of parts which are duplicated on both sides of cylinder 7 (i.e. designated as parts "a" and "b" for each side) but such parts are only shown in two-dimensional profile view for sake of clarity. The movement of the relevant parts is illustrated by arrows where the solid lines in the drawing represent the initial position of cylinder 7 and the locking device 29 near the end of the first lift phase. The dotted lines in the drawing represent the position of cylinder 7 and locking device 29 at the point where hooks 31a and 31b have fully immobilized pivot 15, after cylinder 7 and locking device 29 have moved as illustrated by the arrows.

This disclosure of the locking device relates entirely to a single cylinder truck hoist. If a twin cylinder hoist were used, each with its own lever mechanism 9, there would be two rollers 37, with one linkage mechanism 35, and one hook 31 located between the two cylinders. Each cylinder would, of course, have its own properly spaced pivot 17.

Once given the above disclosure, many other features, modifications, and improvements will become apparent to the skilled artisan. Such other features, modifications, and improvements are therefore considered to be part of this invention, the scope of which is to be determined by the following claims:

What is claimed is:

1. A hoist for raising or lowering a truck bed to and from a truck frame which is capable of being located between said bed and said frame, said hoist comprising:

an extendible and retractable cylinder connected at one end to a lever mechanism and at the other end connectable to the underside of said bed, said lever mechanism comprising at least a first pivot, a first pivot centerline, a second pivot, and an elongated arm, said first pivot being attachable to said truck frame and said second pivot being rotatably attached to said cylinder, said second pivot being located at a first offset distance from said first pivot centerline, and being rotatable about said first pivot when said cylinder is extended or retracted, said elongated arm being pivotally connected to said first pivot at one end and comprising a first roller mechanism for engagement with said truck bed at the other end, said elongated arm extending and angling upwardly from said first pivot; said lever mechanism being so located that when said cylinder is caused to extend, said cylinder pushes against said lever mechanism causing said lever mechanism to rotate about said first pivot, and causing said elongated arm to raise said bed from said frame; said hoist further including a stop mechanism so located at a second selected offset distance from said first pivot centerline opposite the side of said first pivot centerline of said first offset distance, such that when said second pivot is caused to rotate into contact with said stop mechanism said second pivot is located proximal said second offset distance; and further extension of said cylinder causes said cylinder to raise said bed further from said frame.

2. A hoist for raising or lowering a truck bed to and from a truck frame which is capable of being located between said bed and said frame, said hoist comprising:

an extendible and retractable cylinder connected at one end to a lever mechanism and at the other end connectable to the underside of said bed, said lever mechanism comprising at least a first pivot, a first pivot centerline, a second pivot, and an elongated arm, said first pivot being attachable to said truck frame and said second pivot being rotatably attached to said cylinder, said second pivot being located at a first offset distance from said first pivot centerline, and being rotatable about said first pivot when said cylinder is extended or retracted, said elongated arm being pivotally connected to said first pivot at one end and comprising a first roller mechanism for engagement with said truck bed at the other end, said elongated arm extending from said first pivot; said lever mechanism being so located that when said cylinder is caused to extend, said cylinder pushes against said lever mechanism causing said lever mechanism to rotate about said first pivot, and causing said elongated arm to raise said bed from said frame; said hoist further including a stop mechanism so located at a selected offset distance from said first pivot centerline opposite the side of said first pivot centerline of said first offset distance, such that when said second pivot is caused to rotate into contact with said stop mechanism, further extension of said cylinder causes said cylinder to raise said bed further from said frame; said hoist further comprising a locking device to lock said second pivot at a point of rotation about said first pivot.

3. A hoist according to claim 1 further comprising:

a locking device to lock said second pivot at a point of rotation about said first pivot.

4. A hoist according to claim 2 or 3 wherein said locking device comprises:

at least one hook; at least one linkage mechanism pivotally attached to said lever mechanism on said first pivot and pivotally attached to said hook; a second roller mechanism pivotally attached to said linkage mechanism; a biasing mechanism; whereby, when said cylinder raises said bed, said second roller mechanism rolls against said cylinder, causing said linkage mechanism to push said hook against the force of said biasing mechanism and position said hook such that said hook locks said second pivot at its position of rotation about said first pivot.

5. A hoist according to claim 1, 2, or 3 further comprising:

a track mechanism connectable to the underside of said bed for engagement with said elongated arm.

6. A hoist according to claim 4 further comprising:

a track mechanism connectable to the underside of said bed for engagement with said elongated arm.

7. In combination, a truck having a raisable and lowerable dump bed and a frame member to which said dump bed is pivotally attached and a truck hoist device located between said frame and said bed for raising and lowering said bed, the improvement comprising the hoist according to claim 1, 2, or 3.

8. In combination, a truck having a raisable and lowerable dump bed and a frame member to which said dump bed is pivotally attached and a truck hoist device located between said frame and said bed for raising and lowering said bed, the improvement comprising the hoist according to claim 4.

9. In combination, a truck having a raisable and lowerable dump bed and a frame member to which said dump bed is pivotally attached and a truck hoist device located between said frame and said bed for raising and lowering said bed, the improvement comprising the hoist according to claim 5.

10. In combination, a truck having a raisable and lowerable dump bed and a frame member to which said dump bed is pivotally attached and a truck hoist device located between said frame and said bed for raising and lowering said bed, the improvement comprising the hoist according to claim 6.

11. A hoist according to claim 1 wherein said hoist has two lift phases, the first phase having two lift points, and the second phase having one lift point.

12. A hoist according to claim 2 wherein said hoist has two lift phases, the first phase having two lift points, and the second phase having one lift point.

13. A hoist according to claim 11 further comprising:

a locking device to lock said second pivot at a point of rotation about said first pivot.

14. A hoist according to claim 12 or 13 wherein said locking device comprises:

at least one hook; at least one linkage mechanism pivotally attached to said lever mechanism on said first pivot and pivotally attached to said hook; a second roller mechanism pivotally attached to said linkage mechanism; a biasing mechanism; whereby, when said cylinder raises said bed, said second roller mechanism rolls against said cylinder, causing said linkage mechanism to push said hook against the force of said biasing mechanism and position said hook such that said hook locks said second pivot at its position of rotation about said first pivot.

15. A hoist according to claim 11, 12, or 13 further comprising:

a track-mechanism connectable to the underside of said bed for engagement with said elongated arm.

16. A hoist according to claim 14 further comprising:

a track mechanism connectable to the underside of said bed for engagement with said elongated arm.

17. In combination, a truck having a raisable and lowerable dump bed and a frame member to which said dump bed is pivotally attached and a truck hoist device located between said frame and said bed for raising and lowering said bed, the improvement comprising the hoist according to claim 11, 12, or 13.

18. In combination, a truck having a raisable and lowerable dump bed and a frame member to which said dump bed is pivotally attached and a truck hoist device located between said frame and said bed for raising and lowering said bed, the improvement comprising the hoist according to claim 14.

19. In combination, a truck having a raisable and lowerable dump bed and a frame member to which said dump bed is pivotally attached and a truck hoist device located between said frame and said bed for raising and lowering said bed, the improvement comprising the hoist according to claim 15.

20. In combination, a truck having a raisable and lowerable dump bed and a frame member to which said dump bed is pivotally attached and a truck hoist device located between said frame and said bed for raising and lowering said bed, the improvement comprising the hoist according to claim 16.

* * * * *